United States Patent
Benz

(10) Patent No.: US 7,151,989 B2
(45) Date of Patent: Dec. 19, 2006

(54) TWIN-CLUTCH GEARBOX AND METHOD FOR SHIFTING AN INITIAL GEAR UPWARDS INTO A TARGET GEAR IN THE TWIN-CLUTCH GEARBOX OF A MOTOR VEHICLE

(75) Inventor: Jürgen Benz, Oberkirch (DE)

(73) Assignee: LuK Lamellen und Kupplungsbau Betelligungs KG, Buehl (DE)

( * ) Notice: Subject to any disclaimer, the term of this patent is extended or adjusted under 35 U.S.C. 154(b) by 153 days.

(21) Appl. No.: 10/711,244

(22) Filed: Sep. 3, 2004

(65) Prior Publication Data
US 2005/0064991 A1 Mar. 24, 2005

Related U.S. Application Data

(63) Continuation of application No. PCT/DE03/00647, filed on Feb. 28, 2003.

(30) Foreign Application Priority Data
Mar. 7, 2002 (DE) ................................ 102 09 917

(51) Int. Cl.
*G06F 7/00* (2006.01)
*B60W 10/10* (2006.01)

(52) U.S. Cl. ............................ 701/51; 701/52; 477/79; 192/3.51

(58) Field of Classification Search ............ 701/51–52, 701/54–56, 67–68; 477/34, 79, 166, 181; 192/3.51
See application file for complete search history.

(56) References Cited

U.S. PATENT DOCUMENTS

| 5,454,763 A | * | 10/1995 | Ikebuchi et al. | ............ 475/128 |
| 5,603,672 A | | 2/1997 | Zhang | |
| 5,915,512 A | * | 6/1999 | Adamis et al. | ............ 192/3.61 |

* cited by examiner

*Primary Examiner*—Y. Beaulieu
(74) *Attorney, Agent, or Firm*—Simpson & Simpson, PLLC

(57) ABSTRACT

The invention relates to a method for shifting an initial gear upwards into a target gear in a twin-clutch gearbox of a motor vehicle. According to the invention, the engine torque ($M_{Motor}$) of the vehicle is altered when a target gear is selected incorrectly and detected thus. The output torque ($M_{Output}$) is then reduced if the correct target gear is introduced. The invention also relates to a twin-clutch gearbox, especially for carrying out said method.

15 Claims, 3 Drawing Sheets

TWIN-CLUTCH GEARBOX AND METHOD FOR SHIFTING AN INITIAL GEAR UPWARDS INTO A TARGET GEAR IN THE TWIN-CLUTCH GEARBOX OF A MOTOR VEHICLE

CROSS-REFERENCE TO RELATED APPLICATIONS

This application is filed under 35 U.S.C. § 120 and § 365 (c) as a continuation of International Patent Application PCT/DE03/00647, filed Feb. 28, 2003, which application is incorporated herein by reference. This application also claims priority of German Patent Application No. 102 09 917.0, filed Mar. 7, 2002, which application is incorporated herein by reference.

BACKGROUND OF THE INVENTION

The present invention relates to a twin-clutch transmission and a method for carrying out an upshift from an initial gear into a target gear in the twin-clutch transmission of a vehicle.

Twin-clutch transmissions, especially parallel shift transmissions, and shifting strategies for these transmission systems are known from vehicle technology. It has been shown that it is possible, especially with parallel shift transmissions, that at the beginning of the shifting an incorrect target gear is engaged on the target shaft. For a successful crossover shift, the target gear must therefore first be changed. In particular with pulling downshifts, this time can be used to accelerate the engine to the target speed. However, in upshifts the vehicle is further accelerated long enough for the target gear to be engaged. In particular when the driver manually triggers the shift command, this can lead to impairments of comfort.

OBJECTS OF THE INVENTION

The object of the invention is therefore to provide a twin-clutch transmission and a method for carrying out upshifting from an initial gear into a target gear in a twin-clutch transmission of a vehicle with which comfortable shifting is realized, especially in the event of incorrectly engaged target gears.

This objective is achieved on the one hand by a method of the invention in which engine torque $M_{Motor}$ of the vehicle, when there is an incorrectly engaged target gear, is changed in such a manner that output torque $M_{Output}$ is reduced if the correct target gear is engaged. In this way the driver, by reducing the engine torque, can experience an acceleration that he has with the requested driver's desired torque $M_{FW}$ in the target gear.

Within the context of a further development of the invention, it may be provided that engine torque $M_{Motor}$ is reduced, for example, at the beginning of a pulling upshift or the like until the target gear is engaged. Preferably, engine torque $M_{Motor}$ can be increased thereafter to a torque desired by the driver $M_{FW}$ so that the shifting is not carried out at too low a torque level.

SUMMARY OF THE INVENTION

According to one embodiment of the invention, an engine torque ($M_{Motor}$) may be maximally decreased to a reduced engine torque ($M_{Red}$), which preferably may be determined according to the following equation:

$$M_{Red} = M_{FW}\left(1 - \frac{i_{alt} - i_{neu}}{i_{alt}}\right)$$

In this context, the driver's desired torque is labeled $M_{FW}$, the ratio of the initial gear is labeled $i_{alt}$, and the ratio of the target gear is labeled $i_{neu}$.

According to the invention, the maximum engine torque $M_{Red}$ to be reduced when an incorrectly pre-selected target gear is detected may be determined in a first phase. Then a check is made of whether the engine torque $M_{Motor}$ is greater than the maximum engine torque $M_{Red}$ to be reduced. If this is the case, the engine torque, for example, can be decreased in a linear or similar manner to a reduced engine torque $M_{Red}$ until the target gear is engaged. Should the reduced engine torque $M_{Red}$ already be reached, it is possible to wait until the target gear is engaged. After the pre-selection of the target gear, the first phase is terminated. Thereafter, a second phase may follow in which a crossover shift is carried out, it being possible to increase engine torque $M_{Motor}$ to a driver's desired torque $M_{FW}$. A particular advantage of this shifting strategy lies in the fact that in the first stage the vehicle is no longer fully accelerated so that, in particular with full-throttle shifts, the vehicle is prevented from reaching speeds in the range of the engine speed limiter of the internal combustion engine.

According to a next further development of the invention, it may be provided that at the beginning of the second phase a check is made of whether engine torque $M_{Motor}$ is less than the driver's desired torque $M_{FW}$. If this is the case, the engine setpoint torque $M_{Mot\_soll}$ may be increased until the driver's desired torque $M_{FW}$ is reached. Then the particular clutch torque on each clutch, M_Kupp1 and M_Kupp2 is determined on the clutches of the initial gear and the target gear. Thereafter, the crossover shift is terminated.

The shifting method presented here may be used in particular with uninterrupted shift transmissions (USG), such as twin-clutch transmissions or parallel shift transmissions.

The objective of the present invention may be achieved, on the other hand, via a twin-clutch transmission for a vehicle, especially to carry out the proposed method. The twin-clutch transmission of the invention may have at least one device for the detection of an incorrectly pre-selected target gear with which the engine torque $M_{Motor}$ is also changed in such a manner that the output torque $M_{output}$ is reduced if the correct target gear is engaged.

BRIEF DESCRIPTION OF THE DRAWINGS

Further advantages and advantageous embodiments arise from the dependent claims and the drawing described below. In the drawing:

DETAILED DESCRIPTION OF THE PREFERRED EMBODIMENT

Figure 1:
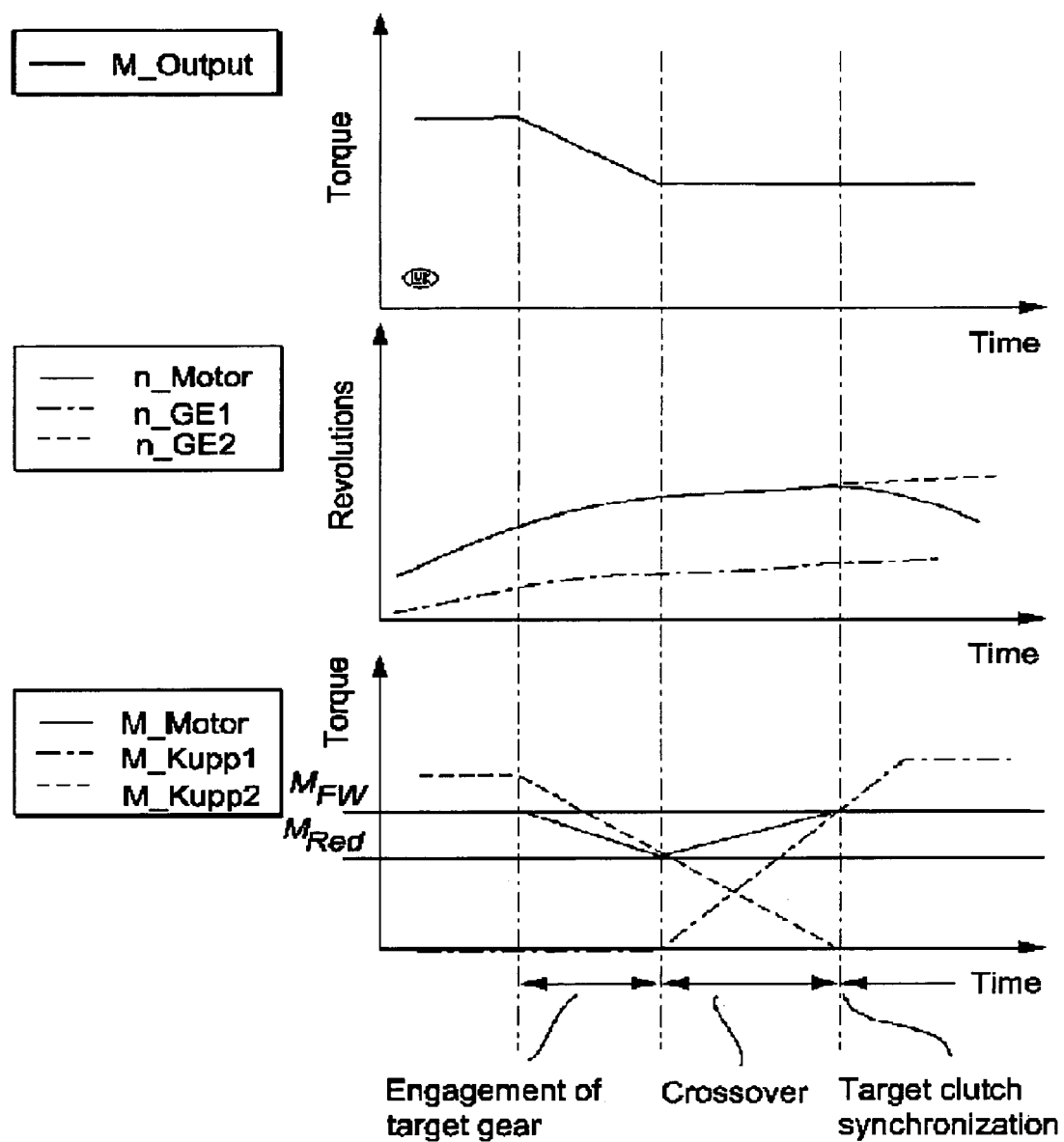
FIG. 1 shows diagrams with torques and speed curves during a pulling upshift in reference to the method of the invention.

In FIG. 1, the curve of output torque $M_{output}$ during a pulling upshift is illustrated in the top diagram. Shown in the center diagram are the curves of the engine speed: speed n_GE1 of the transmission input shaft assigned to the initial gear and speed n_GE2 of the transmission input shaft assigned to the target gear. Depicted in the bottom diagram are the curves of engine torque $M_{Motor}$, of clutch torque M_Kupp1 on the clutch assigned to the initial gear and of clutch torque M_Kupp2 on the clutch assigned to the target gear. The pulling upshift in this context is divided into a first phase (engagement of the target gear) and a second phase (crossover).

In the method of the present invention, the decrease of the output torque $M_{output}$, in contrast to other typical shifting strategies, occurs during the first phase on the target gear level. This means that the synchronization of the engine speed to the target gear occurs later than in a shift with a correctly pre-selected target gear. If the engagement of the target gear takes longer than the decrease of engine torque $M_{Motor}$ to reduced engine torque $M_{Red}$, the target torque $M_{Red}$ may be held long enough for the target gear to be engaged. If the phase is shorter, it is possible to transition directly into the second phase before reaching $M_{Red}$. In this case, however, there may be a limitation due to the maximum driving speed of the clutches.

Figure 2:
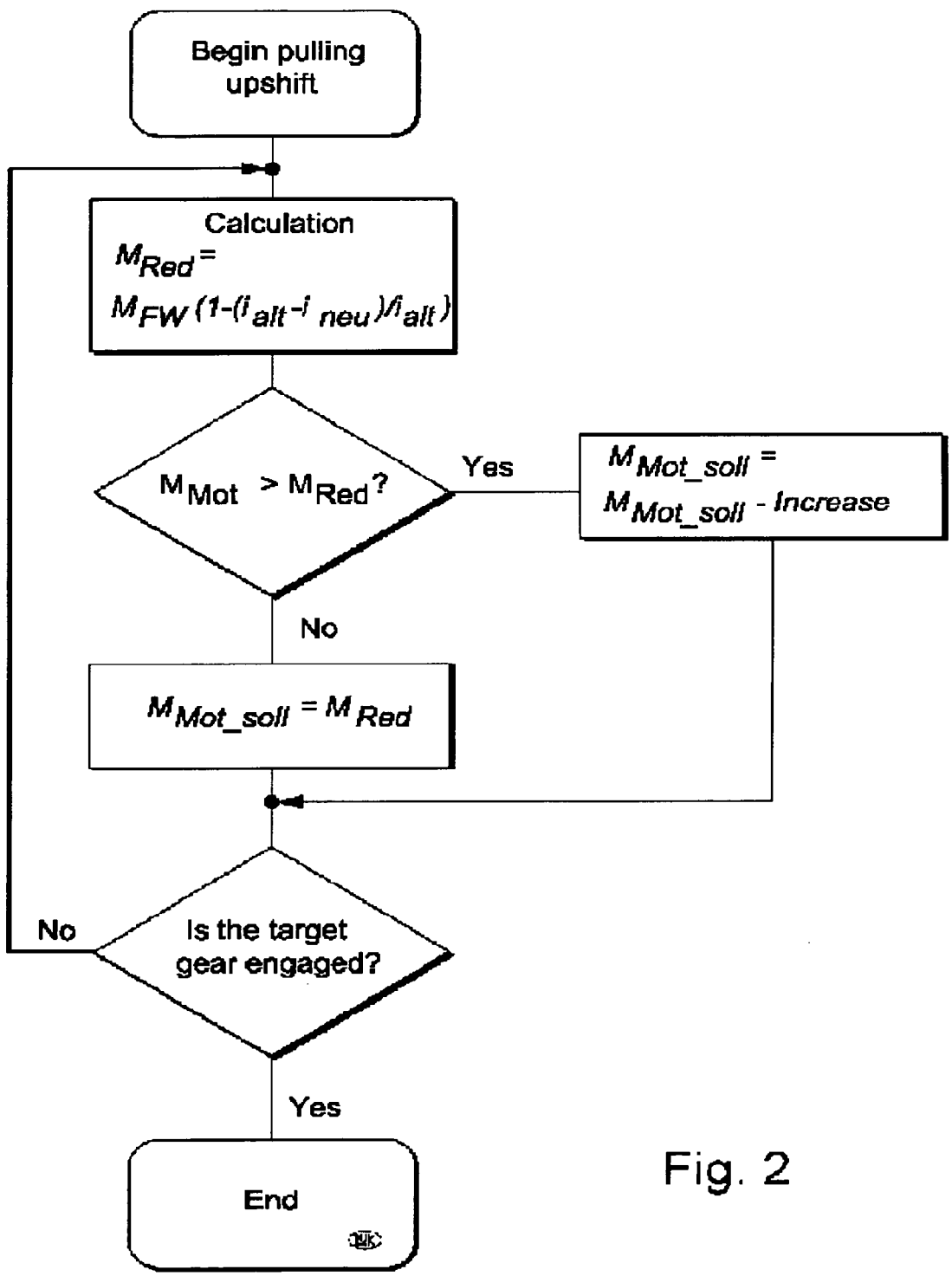
FIG. 2 shows a flow diagram of a first phase of the method of the invention; and, FIG. 3 shows a flow diagram of a second phase of the method of the invention.

Illustrated in FIG. 2 is a flow diagram of the first phase. At the beginning of the first phase, upon recognition of an incorrectly pre-selected target gear, the maximum engine torque to be reduced $M_{Red}$ is determined. Then a check is made of whether engine torque $M_{Motor}$ is greater than the maximum engine torque $M_{Red}$ to be reduced. If this is the case, engine torque $M_{Motor}$ may be decreased in a linear manner to a reduced engine torque $M_{Red}$ until the target gear is engaged. If the reduced engine torque $M_{Red}$ is reached, the system waits until the target gear is engaged. Should several steps be required in order to reach the reduced engine torque $M_{Red}$, the described procedure is repeated. After engagement of the target gear, the first phase is terminated.

Figure 3:
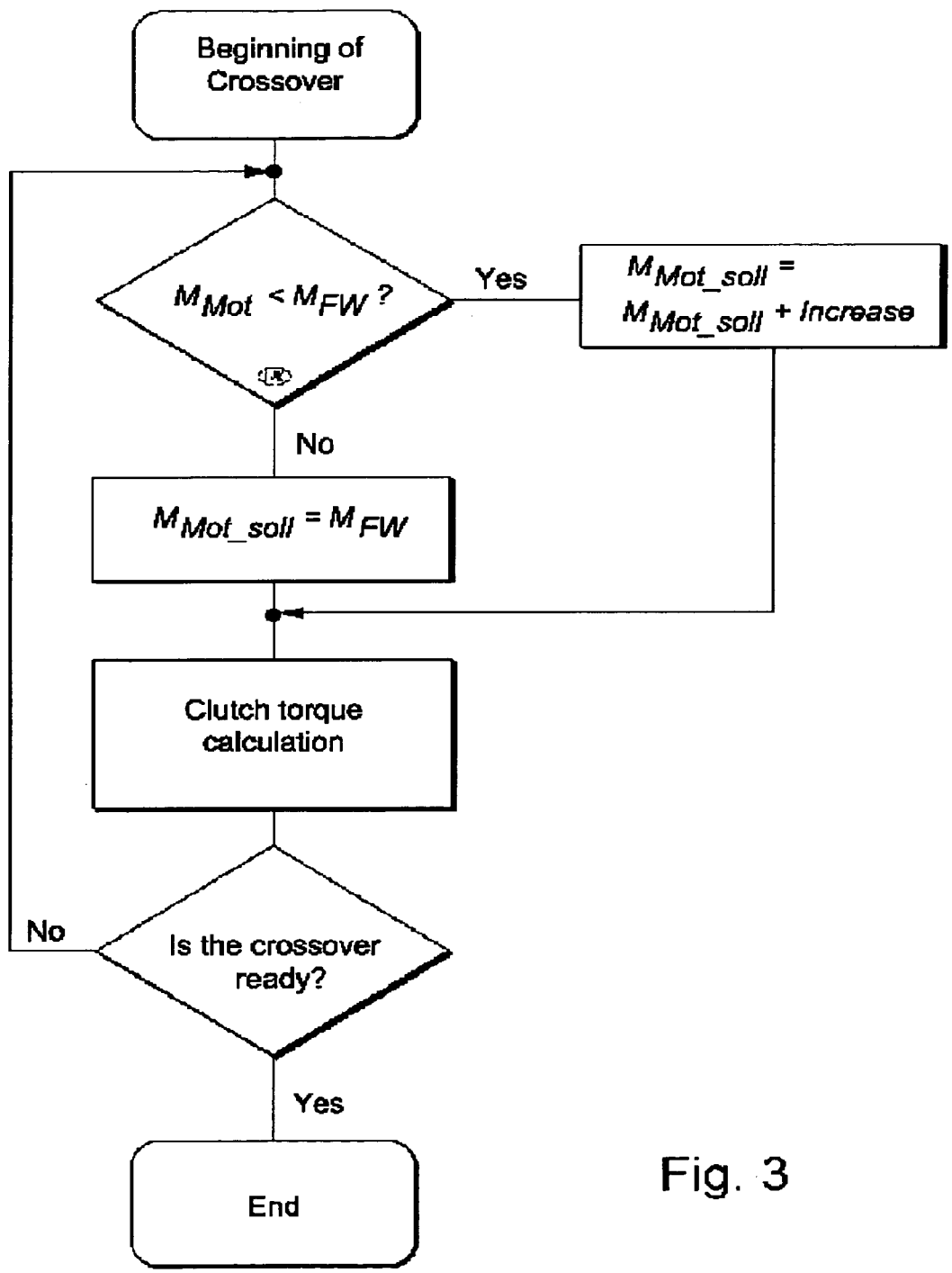

A flow diagram of the second phase is illustrated in FIG. 3. At the beginning of the second phase, a check is made of whether the engine torque $M_{Motor}$ is smaller than the driver's desired torque $M_{FW}$. If so, the engine torque $M_{Motor}$ is increased in a linear manner until the driver's desired torque $M_{FW}$ is present. Thereafter, the particular clutch torques M_Kupp1 and M_Kupp2 are calculated. This may be repeated until the crossover shift is terminated.

The patent claims submitted with the application are proposed formulations without prejudice to the achievement of further patent protection. The applicant reserves the right to submit claims for further combinations of features previously only disclosed in the description and/or the drawings.

References used in dependent claims refer to the further development of the subject matter of the principal claim via the features of the particular dependent claim; they are not to be understood as a renunciation of achieving independent protection for the combination of features for the dependent claims that are referenced.

Since the subject matter of the dependent claims may constitute separate and independent inventions in relation to the state of the art on the priority date, the applicant reserves the right to make them the subject matter of independent claims or division declarations. Furthermore, they may also contain independent inventions that have a design that is independent of the subject matter of the preceding dependent claims.

The embodiments are not to be understood as a restriction of the invention. Rather, numerous amendments and modifications are possible within the context of the current disclosure, especially those variants, elements and combinations and/or materials that one skilled in the art may learn, for example, by combining individual ones together with those in the general description and embodiments in addition to features and/or elements or methodological steps described in the claims and contained in the drawings with the aim of achieving the objective and leading to a new subject matter or new methodological steps or sequences of steps via combinable features, even as far as production, testing and work procedures are concerned.

I claim:

1. A method of up-shifting a twin-clutch transmission of a vehicle, comprising:
   detecting an incorrectly pre-selected target gear;
   calculating a maximum output torque ($M_{Red}$) for an engine in said vehicle, said $M_{Red}$ associated with operation of said transmission in a correct target gear;
   reducing a current output torque ($M_{Motor}$) for said engine to equal said $M_{Red}$; and,
   engaging said correct target gear.

2. The method of claim 1 further comprising:
   setting a first setpoint torque ($M_{Mot\_soll}$) for said engine equal to said $M_{Red}$.

3. The method of claim 1 wherein reducing a current output torque ($M_{Motor}$) further comprises decreasing a second setpoint torque $M_{Mot\_soll}$.

4. The method of claim 3 wherein decreasing a second setpoint torque $M_{Mot\_soll}$ further comprises linearly decreasing said second setpoint torque $M_{Mot\_soll}$.

5. The method of claim 1 further comprising:
   determining whether said $M_{Motor}$ is greater than said $M_{Red}$; and,
   performing at least two iterations of said steps of calculating said $M_{Red}$, determining whether said $M_{Motor}$ is greater than said $M_{Red}$, and reducing $M_{Motor}$ to equal said $M_{Red}$.

6. The method of claim 1 wherein calculating said $M_{Red}$ further comprises calculating said $M_{Red}$ according to the following equation:

$$M_{Red} = firstM_{FW}\left(1 - \frac{i_{alt} - i_{neu}}{i_{alt}}\right),$$

wherein said first $M_{FW}$ comprises a driver's desired torque, said $i_{alt}$ comprises a ratio of the initial gear, and said $i_{neu}$ comprises a ratio of the correct target gear.

7. The method of claim 1 further comprising:
   checking whether said engine torque $M_{Motor}$ is less than a second desired torque $M_{FW}$ for said engine;
   increasing said $M_{Motor}$ to equal said second desired torque $M_{FW}$;
   calculating clutch torques for first and second clutches in said twin-clutch transmission, said first clutch for a currently engaged gear and said second clutch for said correct target gear; and,
   completing a cross-over shift.

8. The method of claim 7 further comprising:
   setting a third setpoint torque $M_{Mot\_soll}$ equal to said said second desired torque $M_{FW}$.

9. The method of claim 7 wherein increasing said $M_{Motor}$ further comprises increasing a fourth setpoint torque $M_{Mot\_soll}$.

10. The method of claim 9 wherein increasing a fourth $M_{Mot\_soll}$ further comprises linearly increasing said fourth $M_{Mot\_soll}$.

11. The method of claim 7 further comprising:
determining whether said $M_{Motor}$ is less than said second $M_{FW}$; and,
performing at least two iterations of said steps of checking whether said $M_{Motor}$ is less than said second $M_{FW}$; increasing a fourth setpoint torque $M_{Mot\_soll}$ and, calculating said clutch torques for first and second clutches in said twin-clutch transmission.

12. A method of up-shifting a twin-clutch transmission in a vehicle, comprising:
operating said transmission in a gear, wherein a torque $M_{Motor}$ for said engine is associated with operation in said gear;
selecting a higher gear;
calculating a torque $M_{Red}$ for said engine, said $M_{Red}$ associated with operation of said transmission in said higher gear; and,
reducing said $M_{Motor}$ to equal said $M_{Red}$, prior to engaging said higher gear.

13. The method of claim 12 wherein reducing said $M_{Motor}$ to equal said $M_{Red}$, prior to engaging said higher gear further comprises decreasing a first setpoint torque $M_{Mot\_soll}$ for said engine.

14. The method of claim 12 further comprising:
initiating a cross-over to said higher gear;
checking whether said $M_{Motor}$ is less than a torque $M_{FW}$ for said engine, said $M_{FW}$ associated with a throttle control input for said vehicle;
calculating clutch torques for first and second clutches in said twin-clutch transmission, said first clutch associated with said gear and said second clutch associated with said higher gear; and,
completing said cross-over shift to said higher gear.

15. The method of claim 14 further comprising increasing a setpoint torque $M_{Mot\_soll}$ for said engine to increase said $M_{Motor}$.

* * * * *